United States Patent
Morisawa

(10) Patent No.: US 12,403,760 B2
(45) Date of Patent: Sep. 2, 2025

(54) AXIAL GAP MOTOR AND VEHICLE

(71) Applicant: SUBARU CORPORATION, Tokyo (JP)

(72) Inventor: Ryota Morisawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 359 days.

(21) Appl. No.: 17/942,758

(22) Filed: Sep. 12, 2022

(65) Prior Publication Data

US 2023/0086041 A1  Mar. 23, 2023

(30) Foreign Application Priority Data

Sep. 22, 2021  (JP) .................. 2021-153858

(51) Int. Cl.
*B60K 17/04*  (2006.01)
*B60K 7/00*  (2006.01)
(Continued)

(52) U.S. Cl.
CPC .......... *B60K 17/043* (2013.01); *B60K 7/0007* (2013.01); *B60K 17/02* (2013.01);
(Continued)

(58) Field of Classification Search
CPC .... B60K 17/043; B60K 7/0007; B60K 17/02; B60K 2007/003; B60K 2007/0092;
(Continued)

(56) References Cited

U.S. PATENT DOCUMENTS 5,558,589 A * 9/1996 Schmidt .................. B60K 6/48
   903/910
6,155,364 A * 12/2000 Nagano .................... B60K 6/26
   903/910
(Continued)

FOREIGN PATENT DOCUMENTS

JP       2976203 B1 * 11/1999
JP    2005-117834 A    4/2005
(Continued)

*Primary Examiner* — James A Shriver, II
*Assistant Examiner* — Ian Bryce Shelton
(74) *Attorney, Agent, or Firm* — McGinn I.P.Law Group, PLLC

(57) ABSTRACT

A mobile body includes axial gap motors, a multiplexing mechanism, an abnormality detection mechanism, and a blocking mechanism. The axial gap motors generate driving power to be supplied to at least one wheel. The multiplexing mechanism multiplexes the axial gap motors and couples the axial gap motors to the at least one wheel of the mobile body. The abnormality detection mechanism detects an abnormality in the axial gap motors. In a case where the abnormality is detected in a certain axial gap motor of the multiplexed axial gap motors, the blocking mechanism blocks supplying of driving power from the certain axial gap motor independently of the multiplexed axial gap motors other than the certain axial gap motor, and maintains supplying of driving power to the at least one wheel from the multiplexed axial gap motors other than the certain axial gap motor.

13 Claims, 6 Drawing Sheets

(51) Int. Cl.
 B60K 17/02 (2006.01)
 G07C 5/08 (2006.01)
 H02P 5/747 (2006.01)

(52) U.S. Cl.
 CPC ........ H02P 5/747 (2013.01); *B60K 2007/003* (2013.01); *B60K 2007/0092* (2013.01); *G07C 5/0808* (2013.01)

(58) Field of Classification Search
 CPC ..... B60K 17/356; H02P 5/747; H02P 29/024; G07C 5/0808; B60Y 2400/3015; B60Y 2306/13; B60Y 2400/3017; B60Y 2400/40
 See application file for complete search history.

(56) References Cited

U.S. PATENT DOCUMENTS

| | | | | |
|---|---|---|---|---|
| 6,558,283 | B1 * | 5/2003 | Schnelle | B60K 6/445 |
| | | | | 903/910 |
| 9,347,801 | B2 * | 5/2016 | Ozaki | H02P 29/0241 |
| 9,787,144 | B2 * | 10/2017 | Ueda | H02K 1/145 |
| 10,340,780 | B2 * | 7/2019 | Ueda | H02K 29/03 |
| 10,625,594 | B2 * | 4/2020 | Yamamoto | F16H 3/728 |
| 10,958,119 | B2 * | 3/2021 | Ueda | H02K 1/141 |
| 11,543,302 | B2 * | 1/2023 | Seo | B60K 6/24 |
| 2003/0166429 | A1 * | 9/2003 | Tumback | B60K 6/365 |
| | | | | 903/910 |
| 2011/0309726 | A1 * | 12/2011 | Carpenter | H02K 21/24 |
| | | | | 310/75 R |
| 2012/0330490 | A1 * | 12/2012 | Ozaki | H02P 29/0241 |
| | | | | 701/22 |
| 2015/0015126 | A1 * | 1/2015 | Ueda | H02K 1/243 |
| | | | | 310/68 B |
| 2016/0276880 | A1 * | 9/2016 | Ueda | H02K 21/145 |
| 2018/0198332 | A1 * | 7/2018 | Ueda | H02K 16/00 |
| 2019/0168605 | A1 * | 6/2019 | Yamamoto | B60K 17/145 |
| 2019/0266420 | A1 * | 8/2019 | Ge | G06T 7/248 |
| 2020/0247459 | A1 * | 8/2020 | Murata | B62D 5/046 |
| 2021/0075356 | A1 * | 3/2021 | Takahashi | H02P 21/22 |
| 2021/0097785 | A1 * | 4/2021 | Zhang | G01R 31/3277 |
| 2021/0218322 | A1 * | 7/2021 | Mihaila | H02K 5/203 |
| 2021/0234496 | A1 * | 7/2021 | Seo | H02P 29/662 |
| 2022/0144058 | A1 * | 5/2022 | Ben-Ari | F16D 1/10 |

FOREIGN PATENT DOCUMENTS

| | | | | | |
|---|---|---|---|---|---|
| JP | 2007145254 | A | * | 6/2007 | |
| JP | 2010148212 | A | * | 7/2010 | |
| JP | 2018033228 | A | * | 3/2018 | ......... H02P 25/024 |
| JP | 2019-083593 | A | | 5/2019 | |
| JP | 2019208297 | A | * | 12/2019 | |
| WO | WO-2011111617 | A1 | * | 9/2011 | ......... G01D 5/2451 |
| WO | WO-2016056294 | A1 | * | 4/2016 | ............ H02K 1/14 |

* cited by examiner

AXIAL GAP MOTOR AND VEHICLE

CROSS-REFERENCE TO RELATED APPLICATIONS

The present application claims priority from Japanese Patent Application No. 2021-153858 filed on Sep. 22, 2021, the entire contents of which are hereby incorporated by reference.

BACKGROUND

The disclosure relates to an axial gap motor and a vehicle including the axial gap motor.

An automobile as a mobile body is very convenient, and people can get in an automobile to go to various places. In recent years, electrified vehicles equipped with electric motors instead of reciprocating engines to reduce environmental loads have been developed.

As an electric motor that can be installed in an electrified vehicle, axial gap motors disclosed in Japanese Unexamined Patent Application Publication (JP-A) Nos. 2019-208297 and 2005-117834 are known. An axial gap motor includes a disc-shaped rotor and a stator. The disc-shaped rotor includes multiple magnets arranged and fixed in the peripheral direction of the rotor. The stator includes multiple coils arranged in the peripheral direction and is disposed to oppose the rotor with a predetermined gap. In this manner, in an axial gap motor, a rotor and a stator oppose each other with a predetermined gap in the axial direction. This configuration can make the axial gap motor thinner and suitable as an electric motor for a vehicle.

JP-A No. 2010-148212 discloses a mechanism for disconnecting an axial gap motor and an output shaft from each other in the case of the occurrence of an abnormality in the axial gap motor.

SUMMARY

An aspect of the disclosure provides a mobile body. The mobile body includes axial gap motors, a multiplexing mechanism, an abnormality detection mechanism, and a blocking mechanism. The axial gap motors are each configured to generate driving power to be supplied to at least one wheel of the mobile body. The multiplexing mechanism is configured to multiplex the axial gap motors and to couple the multiplexed axial gap motors to the at least one wheel. The abnormality detection mechanism is configured to detect an abnormality in the axial gap motors. In a case where the abnormality is detected in a certain axial gap motor of the multiplexed axial gap motors, the blocking mechanism is configured to: block supplying of driving power from the certain axial gap motor independently of the multiplexed axial gap motors other than the certain axial gap motor; and maintain supplying of driving power to the at least one wheel from the multiplexed axial gap motors other than the certain axial gap motor.

An aspect of the disclosure provides a mobile body. The mobile body includes axial gap motors and circuitry. Each of the axial gap motors is configured to generate driving power to be supplied to at least one wheel. The axial gap motors are multiplexed with a multiplexing mechanism. The multiplexed axial gap motors are coupled to the at least one wheel. The circuitry is configured to detect an abnormality in the axial gap motors. In a case where the abnormality is detected in a certain axial gap motor of the multiplexed axial gap motors, the circuitry is configured to: block supplying of driving power from the certain axial gap motor independently of the multiplexed axial gap motors other than the certain axial gap motor; and maintain supplying of driving power to the at least one wheel from the multiplexed axial gap motors other than the certain axial gap motor.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Currently available technologies, including those disclosed in the above-described publications do not sufficiently meet the market needs, and there are the following issues to be addressed.

With the recent widespread use of electrified vehicles, high output power can be expected and the number of motors installed in an electrified vehicle has increased. Currently, in a four-wheel drive electrified vehicle, a single motor is typically used and power output from the motor is distributed over left and right wheels by using a differential gear. However, an electrified vehicle equipped with three or more motors to implement higher driving performance and higher comfort is being expected.

For example, if a motor is installed for each of the four wheels and the driving of each motor is independently controlled, high driving performance and high comfort can be achieved. In the case of malfunctioning of one of the motors, the mechanism for canceling the coupling state of an axial gap motor disclosed in JP-A No. 2010-148212 may be used. This, however, may impair the comfort.

The above-described issues are applicable not only to four-wheel drive electrified vehicles, but also to other types of mobile bodies, such as trains and buses, in which an axial gap motor can be installed.

The disclosure has been made in view of the above-described issues as an example. It is desirable to provide a mobile body that can maintain high driving performance and high comfort even when an inconvenience occurs in any of two or more multiplexed axial gap motors in a power unit.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

For the configurations of elements other than those discussed in detail below, various structures of known vehicles and those of known axial gap motors including those disclosed in the above-described publications may suitably be used.

[Vehicle 100]

Figure 1:
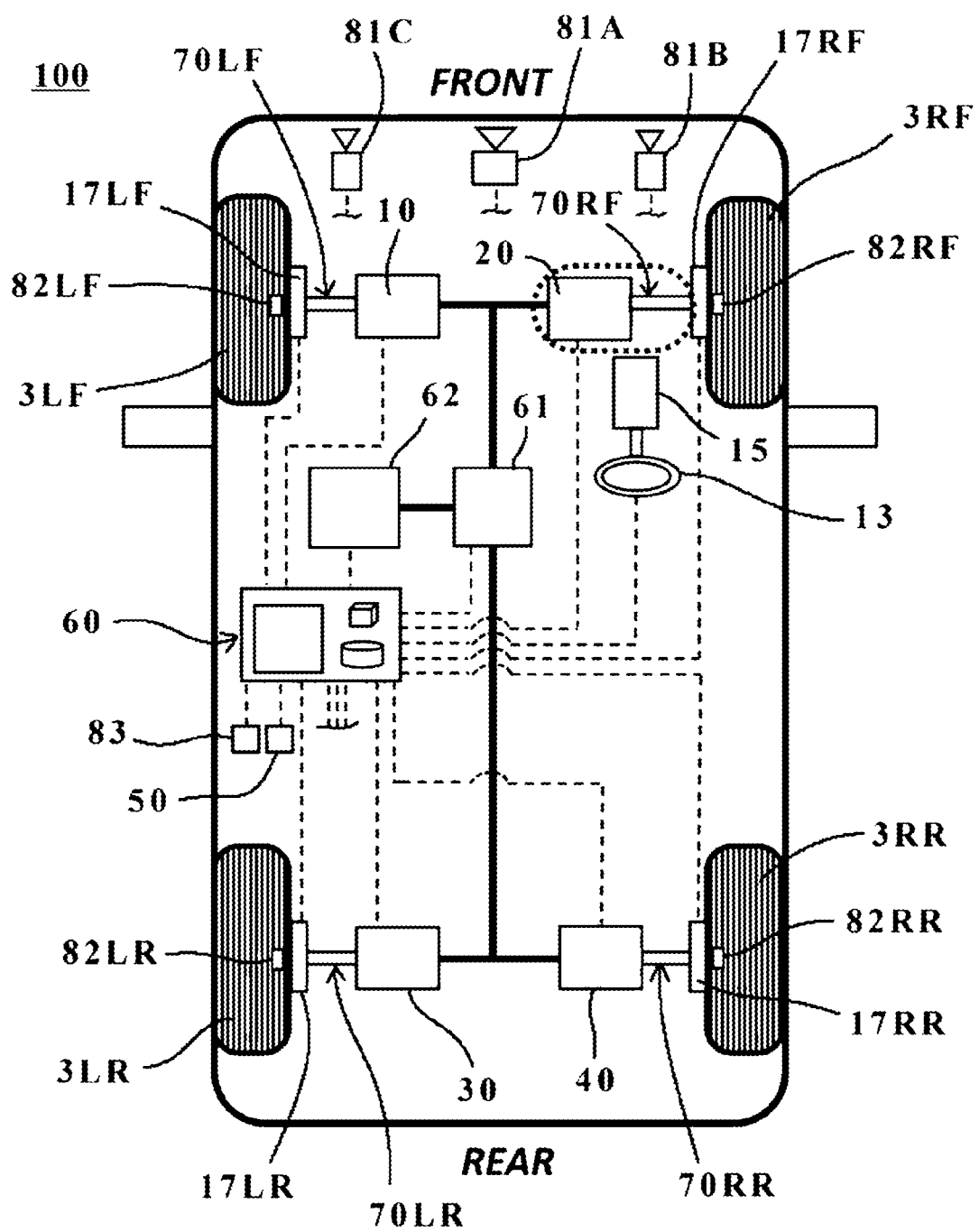
FIG. 1 is a schematic view illustrating an example of the configuration of a mobile body according to an embodiment.

An example of the configuration of a vehicle 100 according to the embodiment is illustrated in FIG. 1.

As an example of a mobile body applicable to the embodiment, a four-wheel drive automobile will be discussed. However, the disclosure may be applied to other types of mobile bodies, such as trains, automobiles other than four-wheel drive automobiles (two-wheel vehicles, for example), and mobile bodies other than those moving on the road (airplanes and helicopters, for example) without departing from the spirit and scope of the disclosure.

(Overall Configuration of Vehicle)

FIG. 1 is a schematic view illustrating an example of the configuration of the vehicle 100 including axial gap motor sets 10, 20, 30, and 40, each of which includes multiplexed axial gap motors, according to the embodiment (hereinafter collectively called the axial gap motor set AGM unless it is necessary to distinguish them from each other) and multiplexing mechanisms 70LF, 70RF, 70LR, and 70RR (hereinafter collectively called the multiplexing mechanism 70 unless it is necessary to distinguish them from each other).

The vehicle 100 illustrated in FIG. 1 is constructed as a four-wheel drive vehicle including the above-described multiplexed axial gap motor set AGM for each of a left front wheel 3LF, a right front wheel 3RF, a left rear wheel 3LR, and a right rear wheel 3RR, each of which serves as a drive wheel (hereinafter collectively called the wheel 3 unless it is necessary to distinguish them from each other). A reduction gear may intervene between the axial gap motor set AGM and the wheel 3.

As units for controlling the driving of the vehicle 100, the vehicle 100 includes an electric power steering unit 15 and a known brake fluid pressure control unit (not illustrated), for example. The electric power steering unit 15 and the brake fluid pressure control unit are controlled by a vehicle control device 60 including one or plural electronic control units (ECUs). The electric power steering unit 15 includes a known electric motor and a known gear mechanism (neither of them is illustrated) and adjusts the steering angles of the left front wheel 3LF and the right front wheel 3RF under the control of the vehicle control device 60. During manual driving, the vehicle control device 60 controls the electric power steering unit 15 based on the steering angle of a steering wheel 13 manipulated by a driver.

As the brake system for the vehicle 100, a hydraulic brake system, for example, is used. The above-described brake fluid pressure control unit adjusts the pressure of a fluid to be supplied to brake calipers 17LF, 17RF, 17LR, and 17RR (hereinafter collectively called the brake caliper 17 unless it is necessary to distinguish them from each other) respectively provided for the wheels 3LF, 3RF, 3LR, and 3RR and causes the brake caliper 17 to generate a braking force. The vehicle control device 60 controls the driving of the brake fluid pressure control unit.

The vehicle control device 60 includes one or plural ECUs. One or plural ECUs of the vehicle control device 60 control the driving of the axial gap motor set AGM which outputs a driving torque to the vehicle 100, the electric power steering unit 15 which controls the steering angle of the steering wheel 13 or that of the left front wheel 3LF and the right front wheel 3RF, and the brake fluid pressure control unit which controls the braking force of the vehicle 100. The vehicle control device 60 may have a function of controlling block processing performed by the multiplexing mechanism 70 that transmits driving power output from the axial gap motor set AGM to the wheel 3.

In addition to a visual sensor 81, a tactile sensor 82, and a motor monitoring sensor 83, which will be discussed later, the vehicle 100 may include various known sensors, such as a global positioning system (GPS) sensor, a vehicle state sensor (velocity sensor, acceleration sensor, angular velocity sensor, steering angle sensor, accelerator position sensor, brake stroke sensor, brake pressure sensor, and engine speed (rpm) sensor, for example).

The visual sensor 81 may include a light detection and ranging (LiDAR) sensor 81A and front-side imaging cameras 81B and 81C, which are known devices, for example.

The LiDAR sensor 81A and the front-side imaging cameras 81B and 81C have a function of obtaining visual information on the environment around the vehicle 100. The front-side imaging cameras 81B and 81C may include imaging elements, such as charge-coupled devices (CCDs) or complementary metal-oxide-semiconductors (CMOSs), which are known elements.

The LiDAR sensor 81A emits optical waves and receives waves reflected by an object so as to detect an object and the distance to the object based on the time from when optical waves are emitted until when reflected waves are received. As the visual sensor 81 for obtaining visual information on the surrounding environment, instead of or in addition to the LiDAR sensor 81A, the vehicle 100 may include one of a radar sensor, such as a millimeter radar, and an ultrasonic sensor or may include plural known sensors. In addition to the front-side imaging cameras 81B and 81C, the vehicle 100 may include a known camera provided on a side view mirror, for example, to image a left rear side or a right rear side of the vehicle 100.

The visual sensor 81 detects an abnormality in the axial gap motor set AGM. For example, the following situation may be considered where the tactile sensor 82 detects an abnormality in the axial gap motor set AGM. If the wheel 3 has fallen into a considerably large hole on the road, it becomes as if it were in the locked state. In this case, if the visual sensor 81 detects this hole on the road in advance, it is possible to avoid a situation where the vehicle control device 60 wrongly operates to block supplying of driving power from the axial gap motor set AGM to the wheel 3 which is seemingly in the locked state. In one embodiment, the visual sensor 81 may serve as an "abnormality detection mechanism".

The tactile sensor 82 is disposed inside the axle of the wheel 3 and has a function of detecting the longitudinal force Fx, lateral force Fy, and vertical force Fz acting on the wheel 3 against the road surface on which the vehicle 100 is running. The tactile sensor 82 is not limited to a particular type of sensor, and a known tire force sensor disclosed in JP-A No. 2006-349440 or another known wheel hub sensor, for example, may be used.

The tactile sensor 82 detects an abnormality in the axial gap motor set AGM. As an example of detecting an abnormality in the axial gap motor set AGM by the tactile sensor 82, the above-described situation where the vehicle control device 60 may wrongly operate if the wheel 3 is caught in a hole on the road is considered. In one embodiment, the tactile sensor 82 may serve as an "abnormality detection mechanism".

To detect an abnormality in the axial gap motor set AGM, the visual sensor 81 and the tactile sensor 82 may be used together. For example, as a result of analyzing an image (image of the road surface ahead of the vehicle 100, for example) obtained by the visual sensor 81, an external force (load torque) is estimated. If, for this estimated load torque, there is a large disparity between a torque value estimated from the output current from an inverter 61 (estimated torque value), which will be discussed later, and a force detected by the tactile sensor 82 (actual torque value), it may be determined that an abnormality has occurred in the axial gap motor set AGM. In this manner, the consistency in the load torque, estimated torque value, and actual torque value is monitored, and if the above-described three values are not equal to each other, an abnormality in the axial gap motor set AGM may be determined.

The motor monitoring sensor 83 has a function of monitoring the presence or the absence of an abnormality in the axial gap motor set AGM. In one example, the motor monitoring sensor 83 is constituted by one or plural known sensors that monitor the current supplied to the axial gap motor set AGM and also monitor the gap and the relative angle between a rotor 21 and stators 22, which will be discussed later.

The motor monitoring sensor 83 is not limited to a particular type of sensor, and sensors disclosed in JP-A Nos. 2018-33228 and 2019-83593, for example, may be used.

The motor monitoring sensor 83 detects an abnormality in the axial gap motor set AGM. In one embodiment, the motor monitoring sensor 83 may serve as an "abnormality detection mechanism".

A navigation system 50 is a known navigation system that sets a driving route to a destination set by an occupant and informs a driver of the set driving route. The above-described GPS sensor is coupled to the navigation system 50. By using this GPS sensor, the navigation system 50 receives a satellite signal from a GPS satellite and obtains information on the position of the vehicle 100 on map data. Instead of a GPS sensor, an antenna may be used to receive a satellite signal from another satellite system that specifies the position of the vehicle 100.

The inverter 61 supplies a DC current for driving the axial gap motor set AGM. The inverter 61 is not limited to a particular type of inverter, and a known inverter that can supply a DC current for driving the axial gap motor set AGM may be used. Although one inverter 61 is illustrated in FIG. 1, plural inverters may be disposed in the vehicle 100 in accordance with the number of axial gap motor sets. Alternatively, the single inverter 61 may control the driving of plural axial gap motor sets.

A battery 62 supplies electric power to the axial gap motor set AGM via the inverter 61 under the control of the vehicle control device 60. The battery 62 is not limited to a particular type of battery, and various known secondary cell batteries, such as a lithium-ion battery, a lead-acid battery, and nickel-metal hydride battery, which are rechargeable batteries, may be used. Although one battery 62 is illustrated in FIG. 1, plural batteries may be disposed in the vehicle 100 in accordance with the number of axial gap motor sets. Alternatively, the single battery 62 may control the driving of plural axial gap motor sets.

(Structure of Power Unit)

As the structure of a power unit in the embodiment, the coupling structure between the axial gap motor set AGM and the wheel 3 will be described below in detail with reference to FIG. 2. The axial gap motor set AGM of the embodiment generates driving power to be supplied to at least one wheel 3.

Figure 2:
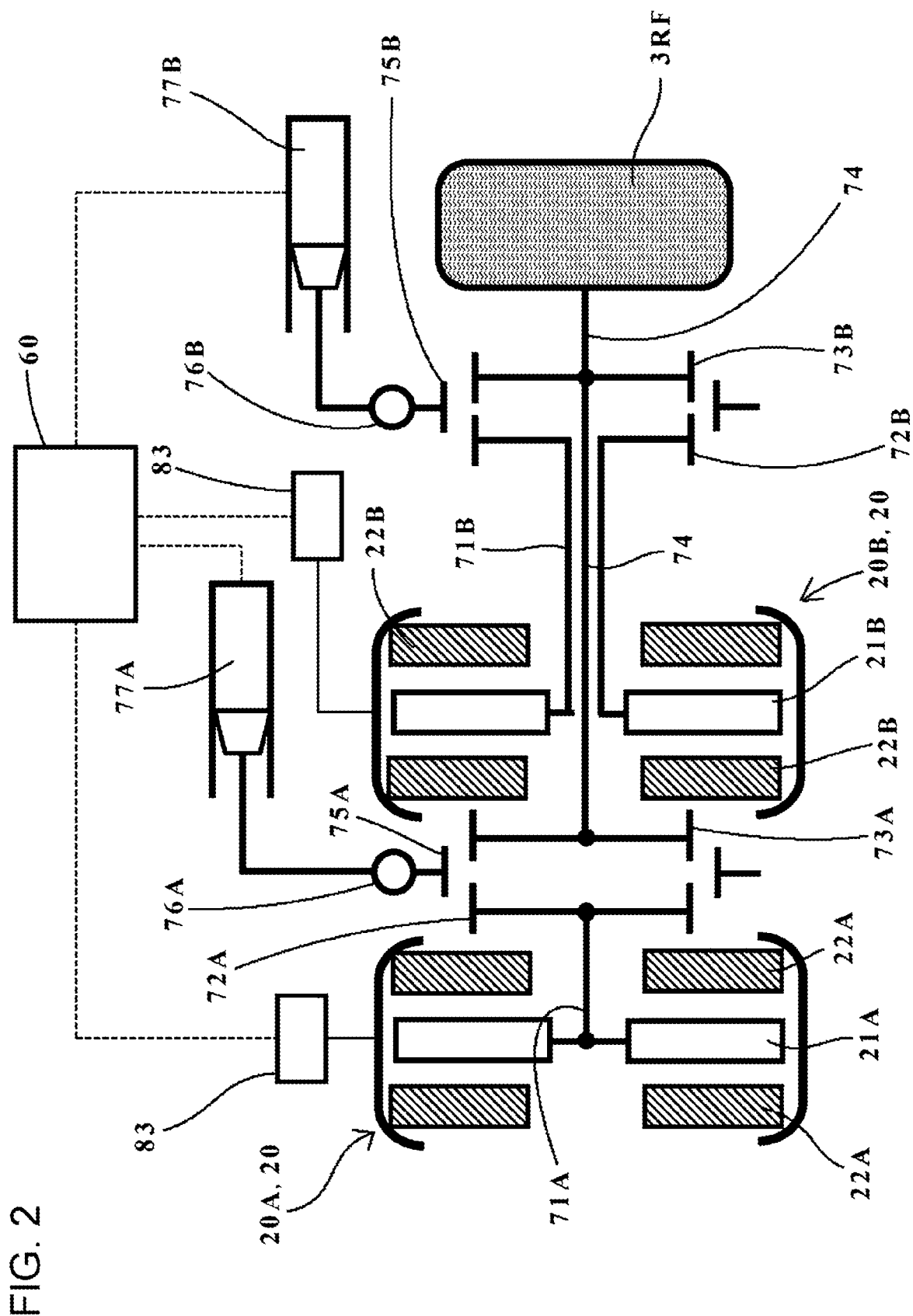
FIG. 2 is a schematic view of a power unit including multiplexed axial gap motors of the embodiment.

As is seen from FIG. 2, the axial gap motor set AGM is coupled to the wheel 3 via the multiplexing mechanism 70 that multiplexes plural axial gap motors and couples them to the wheel 3.

In the following description, the mode in which the axial gap motor set 20 including at least two multiplexed axial gap motors is coupled to the right front wheel 3RF will be discussed by way of example. However, the coupling structure may also be applied to the axial gap motor set and another wheel 3.

As illustrated in FIG. 2, the axial gap motor set 20 in the embodiment includes a first axial gap motor 20A and a second axial gap motor 20B coupled in parallel with the right front wheel 3RF.

The first axial gap motor 20A includes a rotor 21A and a pair of stators 22A, for example. The pair of stators 22A are disposed to oppose each other to sandwich the rotor 21A therebetween. The rotor 21A is coupled to one end of a first motor output shaft 71A. A first output gear 72A is provided at the other end of the first motor output shaft 71A. The first output gear 72A is rotatable together with the rotation of the rotor 21A.

When the rotor 21A is rotated, the first output gear 72A is also rotated via the first motor output shaft 71A. In the rotor 21A, N/S magnetic poles are magnetized in a predetermined pattern by using a known magnet made of a magnetic material.

The pair of stators 22A are disposed to oppose each other to have a predetermined gap with the rotor 21A in the axial direction. As the structure of the stators 22A, the structure of a stator used in a known axial gap motor, such as that disclosed in JP-A No. 2019-208297, may be used. The material for the stators 22A is not limited to a particular material, and a material used for a known stator, such as that disclosed in the above-described publications may be used.

The right front wheel 3RF is coupled to one end of a drive shaft 74 via a known fixture. The drive shaft 74 is movable together with the wheel 3RF. A first driven gear 73A that can receive driving power from the first axial gap motor 20A is fixed at the other end of the drive shaft 74. In the embodiment, driving power can be transmitted from the first output gear 72A to the first driven gear 73A via a first transmission gear 75A.

As illustrated in FIG. 2, the first transmission gear 75A is coupled to a first shift fork 76A. The first shift fork 76A is coupled to a first drive mechanism 77A and can be located at a first position at which the first transmission gear 75A is in engagement with the first output gear 72A and the first driven gear 73A and at a second position at which the first transmission gear 75A is out of engagement with the first output gear 72A and the first driven gear 73A.

The first drive mechanism 77A can drive the first shift fork 76A to move to each of the first and second positions. The first drive mechanism 77A is not limited to a particular type. Various known drive mechanisms, such as an air cylinder mechanism, a fluid pressure cylinder mechanism, a gear mechanism, such as a rack-and-pinion mechanism, an electromagnetic mechanism, such as a linear motor, and a clutch mechanism, may be used as the first drive mechanism 77A.

The above-described first motor output shaft 71A, first output gear 72A, first driven gear 73A, drive shaft 74, and first transmission gear 75A form a multiplexing mechanism in the embodiment.

The above-described first output gear 72A, first shift fork 76A, and first drive mechanism 77A form a blocking mechanism in the embodiment.

The second axial gap motor 21B includes a rotor 21B and a pair of stators 22B, for example. The pair of stators 22B are disposed to oppose each other to sandwich the rotor 21B therebetween. The rotor 21B is coupled to one end of a second motor output shaft 71B. A second output gear 72B is provided at the other end of the second motor output shaft 71B. As illustrated in FIG. 2, the second motor output shaft 71B is formed in a tubular shape into which the first motor output shaft 71A can be inserted so that the second motor output shaft 71B can be rotated coaxially together with the first motor output shaft 71A.

When the rotor 21B is rotated, the second output gear 72B is also rotated via the second motor output shaft 71B. In the rotor 21B, N/S magnetic poles are magnetized in a predetermined pattern by using a known magnet made of a magnetic material, as in the rotor 21A.

The pair of stators 22B are disposed to oppose each other to have a predetermined gap with the rotor 21B in the axial direction. The structure and the material of the stators 22B are not limited to particular types, and the structure of a stator used in a known axial gap motor, such as that disclosed in JP-A No. 2019-208297, may be used.

A second driven gear 73B is fixed between the first driven gear 73A of the drive shaft 74 and the right front wheel 3RF. As is seen from FIG. 2, the second motor output shaft 71B is interposed between the first driven gear 73A and the second driven gear 73B.

In the embodiment, driving power can be transmitted from the second output gear 72B to the second driven gear 73B via a second transmission gear 75B.

As illustrated in FIG. 2, the second transmission gear 75B is coupled to a second shift fork 76B. The second shift fork 76B is coupled to a second drive mechanism 77B and can be located at a first position at which the second transmission gear 75B is in engagement with the second output gear 72B and the second driven gear 73B and at a second position at which the second transmission gear 75B is out of engagement with the second output gear 72B and the second driven gear 73B.

The second drive mechanism 77B can drive the second shift fork 76B to move to each of the first and second positions. As in the first drive mechanism 77A, the second drive mechanism 77B is not limited to a particular type. Various known drive mechanisms, such as an air cylinder mechanism, a fluid pressure cylinder mechanism, a gear mechanism, such as a rack-and-pinion mechanism, and an electromagnetic mechanism, such as a linear motor, may be used as the second drive mechanism 77B.

The above-described second motor output shaft 71B, second output gear 72B, second driven gear 73B, drive shaft 74, and second transmission gear 75B form a multiplexing mechanism in the embodiment.

The above-described second output gear 72B, second shift fork 76B, and second drive mechanism 77B form a blocking mechanism in the embodiment.

(Blocking of Driving Power from Abnormal Axial Gap Motor Using Blocking Mechanism)

An abnormality may occur in an axial gap motor for some reason. Blocking of supplying of driving power from such an axial gap motor by using the blocking mechanism will be discussed below with reference to FIGS. 3 and 4.

Figure 3:
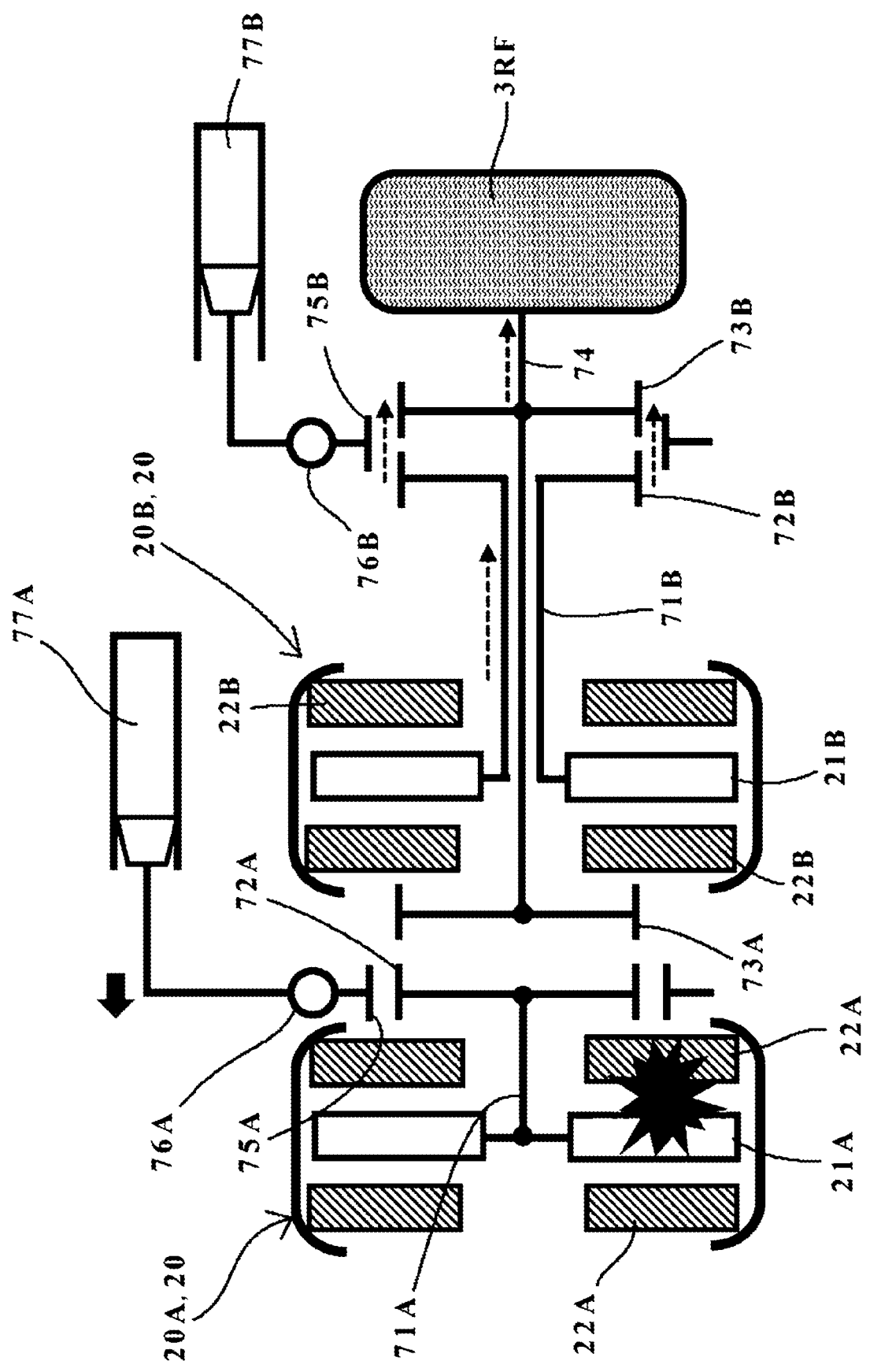
FIG. 3 is a schematic view for explaining a power blocking operation performed by a blocking mechanism when a first axial gap motor of multiplexed axial gap motors malfunctions.

It is now assumed that, as illustrated in FIG. 3, an abnormality has occurred in the first axial gap motor 20A of the multiplexed axial gap motor set 20 that supplies driving power to the right front wheel 3RF.

In this case, the vehicle control device 60 executes control to block supplying of driving power from the first axial gap motor 20A by using the above-described blocking mechanism, independently of another axial gap motor (second axial gap motor 20B) of the multiplexed plural axial gap motors. The vehicle control device 60 also executes control to maintain supply of driving power to the wheel 3 (right front wheel 3RF in the example) from the second axial gap motor 20B in which no abnormality has occurred.

In one example, the first drive mechanism 77A forming the blocking mechanism moves the first transmission gear 75A to the above-described second position via the first shift fork 76A. In this manner, in the case of the occurrence of an abnormality, the first shift fork 76A is driven to shut a power transmission path coupled to the first shift fork 76A via the first transmission gear 75A, thereby disengaging the first transmission gear 75A from the first output gear 72A and the first driven gear 73A.

In contrast, driving power from the second axial gap motor 20B is continuously supplied to the right front wheel 3RF via the multiplexing mechanism including the second transmission gear 75B. It is thus possible to keep transmitting driving power from the second axial gap motor 20B, which is in the normal state, to the right front wheel 3RF, independently of executing blocking control to block supplying of driving power from the first axial gap motor 20A in the abnormal state.

Figure 4:
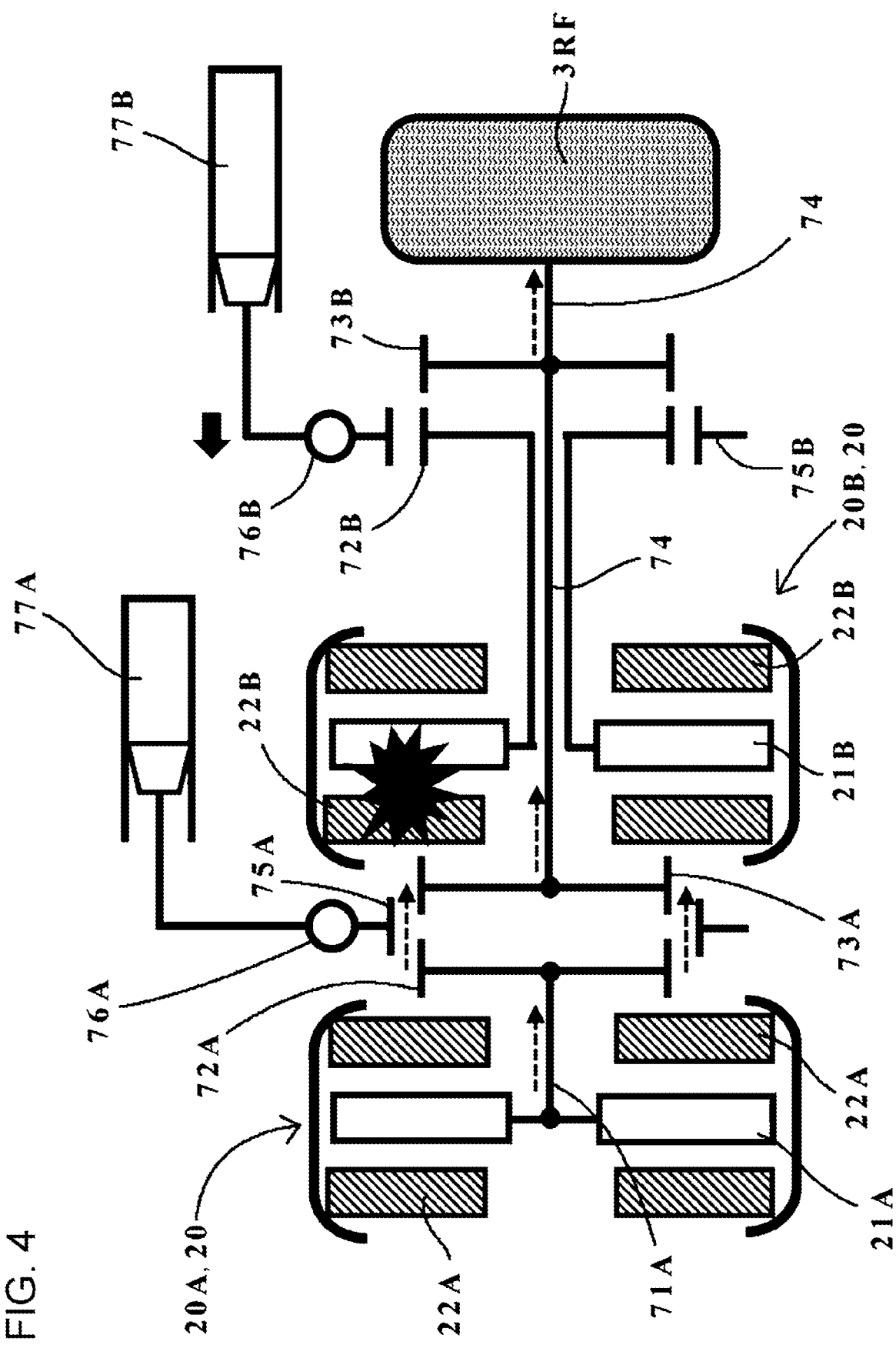
FIG. 4 is a schematic view for explaining a power blocking operation performed by a blocking mechanism when a second axial gap motor of multiplexed axial gap motors malfunctions.

It is now assumed that, as illustrated in FIG. 4, an abnormality has occurred in the second axial gap motor 20B of the multiplexed axial gap motor set 20 that supplies driving power to the right front wheel 3RF.

In this case, the vehicle control device 60 executes control to block supplying of driving power from the second axial gap motor 20B by using the above-described blocking mechanism, independently of the first axial gap motor 20A. The vehicle control device 60 also executes control to maintain supplying of driving power to the wheel 3 (right front wheel 3RF in the example) from the first axial gap motor 20A in which no abnormality has occurred.

(Control Method for Multiplexed Axial Gap Motors)

Figure 5:
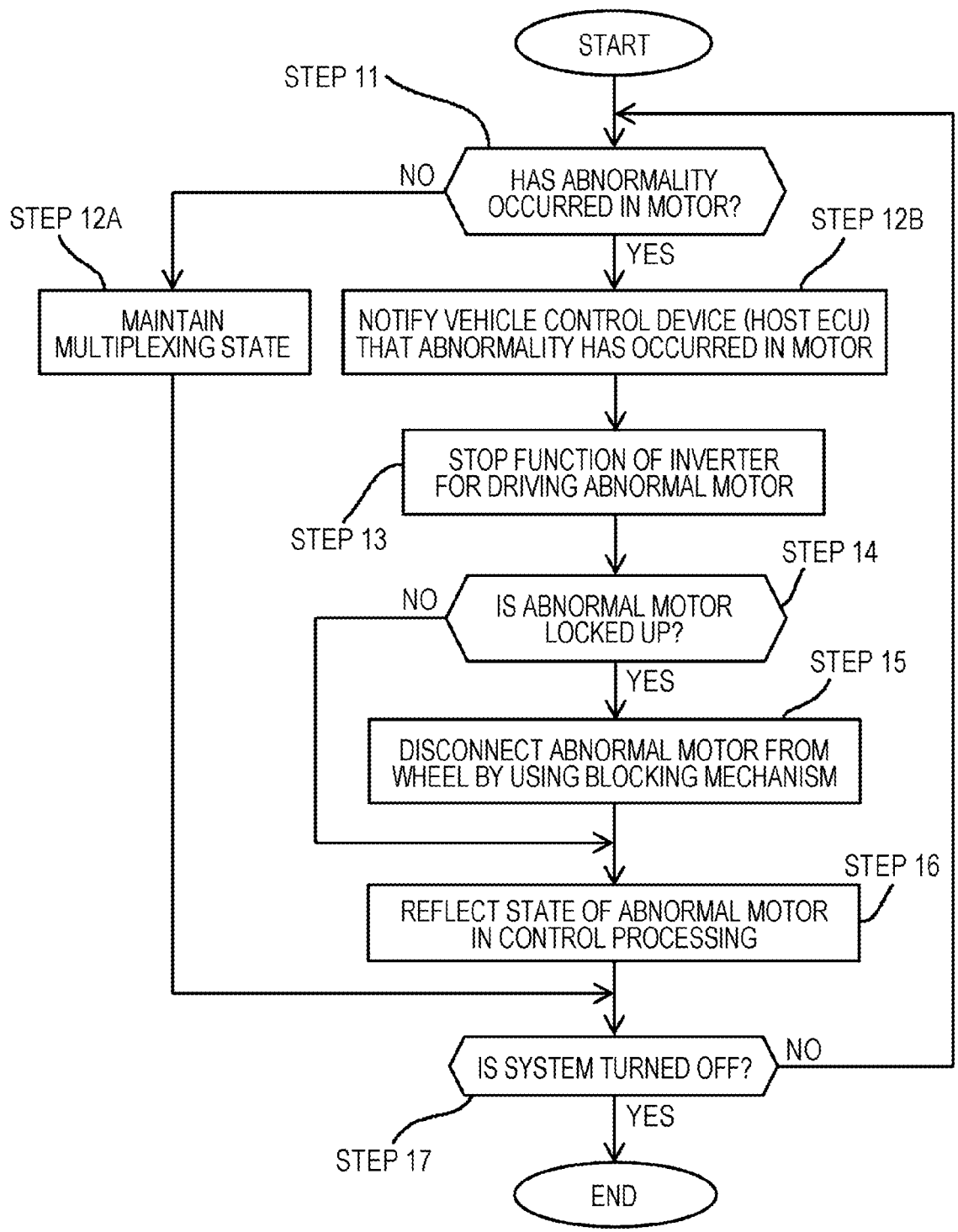
FIG. 5 is a flowchart illustrating a control method for blocking power supply from one of multiplexed axial gap motors in a power unit.

A control method for multiplexed axial gap motors of the embodiment will be described below with reference to FIG. 5. The following control method may be implemented as a result of a processor, such as a central processing unit (CPU), of the vehicle control device 60 executing a computer program. Alternatively, the entirety or part of the control method may be executed by an analog circuit.

In step 11, the vehicle control device 60 determines whether an abnormality has occurred in the axial gap motor set AGM installed in the vehicle 100. In one example, the vehicle control device 60 checks for an abnormality in each axial gap motor forming the axial gap motor set AGM by using the above-described abnormality detection mechanism (at least one of the visual sensor 81, the tactile sensor 82, or the motor monitoring sensor 83) that detects an abnormality in the axial gap motor set AGM.

If it is found in step 11 that no abnormality has occurred, the vehicle control device 60 proceeds to step 12A and executes control to maintain the multiplexing state of the axial gap motors. This makes it possible to continue performing the normal operation of the multiplexed axial gap motors of the axial gap motor set AGM coupled to the wheel 3, which serves as a drive wheel.

If the abnormality detection mechanism has detected an abnormality in a motor forming the axial gap motor set AGM in step 11, it executes notifying processing in step 12B to notify the vehicle control device 60, which is a host ECU, that an abnormality has occurred in a certain motor. Hereinafter, such a motor will also be called the abnormal motor.

After executing notifying processing in step 12B, the operation of the inverter 61 for driving the abnormal motor is stopped in step 13. In one example, if, as illustrated in FIG. 3, an abnormality has occurred in the first axial gap motor 20A of the axial gap motor set 20, the vehicle control device 60 executes control to stop the function of the inverter 61 for driving the first axial gap motor 20A while to continue the function of the inverter 61 for driving another axial gap motor (axial gap motor 20B in the example) which is in the normal state.

In step 14, the vehicle control device 60 determines whether the abnormal motor is locked up. In one example, the vehicle control device 60 may determine whether the abnormal motor is locked up by detecting the operating state of the rotor 21 with the motor monitoring sensor 83. The vehicle control device 60 may alternatively make this determination by detecting the revolutions per minute (rpm) of the motor output shaft 71 coupled to the rotor 21 using a known rpm detection sensor.

If it is found in step 14 that the abnormal motor is not locked up, the state of the abnormal motor is reflected in control processing executed by the vehicle control device 60 in step 16. Although the abnormal motor is unable to supply driving power, the motor output shaft 71 can still rotate via the rotor 21. This means that driving power is not transmitted from the abnormal motor to the wheel 3 but the coupling state between the abnormal motor and the wheel 3 is maintained. In this case, the vehicle control device 60 may adjust the torque balance between the wheels 3 (drive wheels) by reducing driving power to be supplied to another wheel 3, such as the wheel 3 opposite the wheel 3 coupled to the abnormal motor, or by applying the brakes to another wheel 3 in collaboration with vehicle dynamics control (VDC).

In contrast, if it is found in step 14 that the abnormal motor is locked up, the abnormal motor is disconnected from the wheel 3 by using the above-described blocking mechanism in step 15, as illustrated in FIGS. 3 and 4. This makes it unlikely to cause unintentional damage to a transmission and the multiplexing mechanism 70 that couple the wheel 3 and the abnormal motor. As described above, in the embodiment, based on the detection result of the abnormality detection mechanism including at least one of the visual sensor 81 or the tactile sensor 82, the vehicle control device 60 can execute control to block supplying of power from one or more of the axial gap motors of the axial gap motor set AGM.

After executing block processing for the abnormal motor in step 15, the state of the abnormal motor is reflected in step 16. The coupling state of the wheel 3 and the abnormal motor is canceled in step 15 since the abnormal motor is locked up. The vehicle control device 60 may thus adjust the torque balance between the wheels 3 by increasing output from a normal axial gap motor forming the axial gap motor set AGM or by reducing driving power to be supplied to another wheel 3.

After reflecting the state of the abnormal motor in step 16, the vehicle control device 60 determines in step 17 whether the system of the vehicle 100 is turned OFF. If the system of the vehicle 100 is not OFF, the vehicle control device 60 returns to step 11 and re-executes the above-described processing. If the system of the vehicle 100 is turned OFF, the vehicle control device 60 completes the above-described control processing.

In the vehicle 100 (mobile body) including multiplexed axial gap motors, a multiplexing mechanism, and a blocking mechanism according to the embodiment, high driving performance and high comfort can be maintained even if an inconvenience (the above-described locked state, for example) has occurred in any of the multiplexed axial gap motors.

While the embodiment of the disclosure has been discussed above with reference to the accompanying drawings, the disclosure is not restricted to this embodiment.

Figure 6:
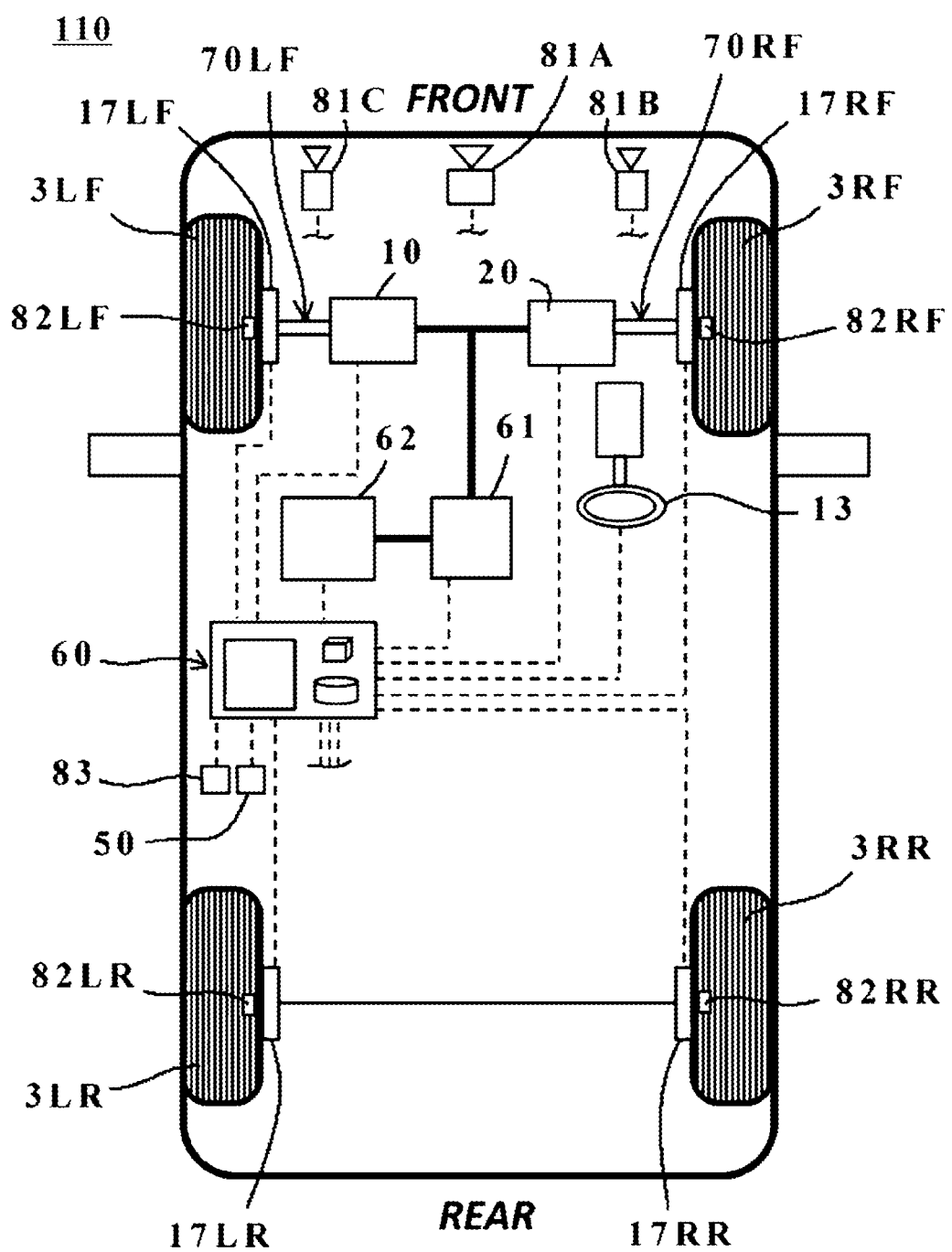
FIG. 6 is a schematic view illustrating an example of the configuration of a mobile body according to a modified example.

A vehicle 110 according to a modified example is illustrated in FIG. 6 by way of example.

The vehicle 100 in the above-described embodiment is constructed as a four-wheel drive vehicle including a multiplexed axial gap motor set AGM for each wheel 3. The disclosure may also be applied to a two-wheel drive vehicle equipped with multiplexed axial gap motor sets AGM only for the front wheels, which serve as drive wheels, as illustrated in FIG. 6. The disclosure may also be appliable to a two-wheel drive vehicle equipped with multiplexed axial gap motor sets AGM for the rear wheels.

In the above-described embodiment and modified example, the multiplexed axial gap motor set AGM is coupled to each wheel 3. However, one multiplexed axial gap motor set AGM may transmit driving power to plural wheels 3 via a known differential gear.

In the above-described embodiment and modified example, two axial gap motors are multiplexed by using the multiplexing mechanism 70. However, the disclosure is not limited to this configuration, and three or more axial gap motors may be multiplexed.

In the above-described embodiment, a case in which an abnormality has occurred in one of the multiplexed axial gap motors has been discussed. Block processing using the blocking mechanism may be executed when an abnormality has occurred in two or more axial gap motors.

It is apparent that practitioners skilled in the art make various modifications and variations without departing from the scope and spirit of the disclosure, and it is understood that such modifications and variations are also encompassed in the technical scope of the disclosure.

The vehicle 100 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle 100 including the vehicle control device 60. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A mobile body comprising:
axial gap motors each configured to generate driving power to be supplied to at least one wheel of the mobile body;
a multiplexing mechanism configured to multiplex the axial gap motors and to couple the multiplexed axial gap motors to the at least one wheel;
an abnormality detection mechanism including at least one sensor and configured to detect an abnormality in the axial gap motors using the at least one sensor; and
a blocking mechanism configured to, in a case where the abnormality is detected in an axial gap motor of the multiplexed axial gap motors,
block supplying of driving power from the axial gap motor, independently of the multiplexed axial gap motors other than the axial gap motor, and
maintain supplying of driving power to the at least one wheel from the multiplexed axial gap motors other than the axial gap motor.

2. The mobile body according to claim 1,
wherein the blocking mechanism is configured to comprise:
a shift fork configured to cause an output gear and a driven gear to be engaged with each other, the driven gear being provided for a drive shaft of the mobile body, the drive shaft being movable together with the at least one wheel, the output gear being rotatable together with rotation of a corresponding axial gap motor of the multiplexed axial gap motors; and
a drive mechanism configured to drive the shift fork, and
wherein, upon detecting the abnormality, the shift fork is driven to release the output gear and the driven gear from being engaged with each other.

3. The mobile body according to claim 1, wherein:
the at least one sensor comprises one or both of a visual sensor and a tactile sensor; and
the blocking mechanism is configured to block supplying of the driving power from one or more of the multiplexed axial gap motors, based on a detection result of the one or both of the visual sensor and the tactile sensor.

4. A mobile body comprising:
axial gap motors each configured to generate driving power to be supplied to at least one wheel of the mobile body;
a multiplexing mechanism configured to multiplex the axial gap motors and to couple the multiplexed axial gap motors to the at least one wheel, the multiplexing mechanism including a drive shaft of the mobile body; and
circuitry configured to
detect an abnormality in the axial gap motors, and
upon detecting the abnormality in an axial gap motor of the multiplexed axial gap motors, block supplying of driving power from the axial gap motor independently of the multiplexed axial gap motors other than the axial gap motor, and
maintain supplying of driving power to the at least one wheel from the multiplexed axial gap motors other than the axial gap motors.

5. The mobile body according to claim 1, wherein
the blocking mechanism comprises:
a shift fork including a transmission gear; and
a drive mechanism configured to cause the shift fork to move between (i) a first position at which the transmission gear is in engagement with an output gear and a driven gear spaced apart from the output gear to connect a power transmission path and (ii) a second position at which the transmission gear is out of engagement with the output gear and the driven gear to shut the power transmission path,
the driven gear is provided for a drive shaft of the mobile body, and is movable together with the at least one wheel,
the output gear is rotatable together with rotation of an axial gap motor of the multiplexed axial gap motors, and
upon detecting the abnormality, the drive mechanism moves the shift fork from the first position to the second position.

6. The mobile body according to claim 4, further comprising:
a shift fork including a transmission gear; and
a drive mechanism configured to cause the shift fork to move between (i) a first position at which the transmission gear is in engagement with an output gear and a driven gear spaced apart from the output gear to connect a power transmission path and (ii) a second position at which the transmission gear is out of engagement with the output gear and the driven gear to shut the power transmission path,
the driven gear is provided for a drive shaft of the mobile body, and is movable together with the at least one wheel,
the output gear is rotatable together with rotation of an axial gap motor of the multiplexed axial gap motors, and
upon detecting the abnormality, the drive mechanism moves the shift fork from the first position to the second position.

7. The mobile body according to claim 4, wherein the circuitry further comprises one or both of a visual sensor and a tactile sensor to detect the abnormality in the axial gap motors, and
the circuitry is configured to block supplying of the driving power from one or more of the multiplexed axial gap motors, based on a detection result of the one or both of the visual sensor and the tactile sensor.

8. The mobile body according to claim 1, wherein
the at least one sensor comprises:
a visual sensor configured to obtain visual information on an environment around the mobile body; and
a tactile sensor configured to dispose inside an axle of the at least one wheel of the mobile body, and detect a longitudinal force, a lateral force, and a vertical force acting on the at least one wheel of the mobile body against a road surface on which the mobile body is running, and
the blocking mechanism is configured to block supplying of driving power from one or more of the multiplexed axial gap motors, based on a detection result of the visual sensor and a detection result of the tactile sensor.

9. The mobile body according to claim 4, wherein
the circuitry further comprises:
a visual sensor configured to obtain visual information on an environment around the mobile body; and a tactile sensor configured to dispose inside an axle of the at least one wheel of the mobile body, and detect a longitudinal force, a lateral force, and a vertical force acting on the at least one wheel of the mobile body against a road surface on which the mobile body is running, and the circuitry is configured to block supplying of driving power from one or more of the multiplexed axial gap motors, based on a detection result of the visual sensor and a detection result of the tactile sensor.

10. The mobile body according to claim 8, wherein the abnormality detection mechanism is configured to:

estimate a first torque value based on an image of the road surface ahead of the vehicle obtained using the visual sensor;

detect a second torque value using the tactile sensor; and determine that the abnormality has occurred in the axial gap motor based on comparing at least the first torque value and the second torque value.

11. The mobile body according to claim 9, wherein the circuitry is configured to:

estimate a first torque value based on an image of the road surface ahead of the vehicle obtained using the visual sensor;

detect a second torque value using the tactile sensor; and determine that the abnormality has occurred in the axial gap motor based on comparing at least the first torque value and the second torque value.

12. The mobile body according to claim 1, further comprising a controller, wherein the controller is configured to adjust, after the blocking mechanism blocks supplying of the driving power from one or more of the multiplexed axial gap motors, torque balance between wheels of the mobile body, and wherein adjusting the torque balance includes increasing output from another axial gap motor the axial gap motor among the multiplexed axial gap motors, or reducing driving power supplied to another wheel than the at least one wheel among wheels of mobile body.

13. The mobile body according to claim 4, wherein the circuitry is configured to adjust, after supplying of the driving power from one or more of the multiplexed axial gap motors is blocked, torque balance between wheels of the mobile body, and wherein adjusting the torque balance includes increasing output from another axial gap motor the axial gap motor among the multiplexed axial gap motors, or reducing driving power supplied to another wheel than the at least one wheel among wheels of mobile body.

* * * * *